United States Patent
Kluge et al.

(10) Patent No.: US 7,882,910 B2
(45) Date of Patent: Feb. 8, 2011

(54) HYBRID DRIVE FOR A MOTOR VEHICLE

(75) Inventors: Marc Kluge, Besigheim (DE); Edmund Sander, Leonberg (DE); Norbert Melinat, Waiblingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 331 days.

(21) Appl. No.: 11/962,937

(22) Filed: Dec. 21, 2007

(65) Prior Publication Data

US 2008/0156555 A1 Jul. 3, 2008

(30) Foreign Application Priority Data

Dec. 22, 2006 (DE) .................. 10 2006 060 872

(51) Int. Cl.
  *B60K 6/20* (2007.10)
(52) U.S. Cl. ............... 180/65.21; 180/65.265; 180/65.28; 180/65.285
(58) Field of Classification Search ........ 180/53.8, 180/65.21, 65.225, 65.245, 65.27, 65.28, 180/65.285; 290/4 C, 40 C
  See application file for complete search history.

(56) References Cited

U.S. PATENT DOCUMENTS

| | | | |
|---|---|---|---|
| 3,458,122 A | 7/1969 | Andriussi at al. | |
| 3,853,098 A | 12/1974 | Ishikawa et al. | |
| 5,097,165 A * | 3/1992 | Mashino et al. ............. | 310/112 |
| 6,027,032 A * | 2/2000 | Aoki et al. ............... | 237/12.3 R |
| 6,093,974 A * | 7/2000 | Tabata et al. ............. | 180/65.25 |
| 6,201,310 B1 * | 3/2001 | Adachi et al. ............... | 290/4 C |
| 6,453,865 B2 * | 9/2002 | Hirose et al. ............. | 180/65.25 |
| 6,927,500 B2 * | 8/2005 | Iwanami et al. ........... | 290/40 C |
| 6,965,173 B2 * | 11/2005 | Fukasaku et al. ........ | 180/65.225 |
| 7,028,794 B2 * | 4/2006 | Odahara et al. .......... | 180/65.25 |
| 7,099,768 B2 * | 8/2006 | Moriya ..................... | 123/179.4 |
| 7,127,903 B2 * | 10/2006 | Kuribayashi .................. | 62/133 |
| 7,182,707 B2 * | 2/2007 | Nakamura ................... | 290/4 C |
| 7,559,384 B2 * | 7/2009 | Palladino ................... | 180/53.8 |
| 7,610,973 B2 * | 11/2009 | Asao et al. ............... | 180/65.21 |
| 2004/0164660 A1 | 8/2004 | Odahara et al. | |

FOREIGN PATENT DOCUMENTS

| | | |
|---|---|---|
| BE | 700 440 | 12/1967 |
| DE | 2 349 945 | 4/1974 |
| DE | 29 51 971 C2 | 7/1981 |
| DE | 44 34 324 A1 | 4/1995 |
| DE | 197 27 058 A1 | 2/1998 |
| DE | 100 45 533 A1 | 4/2002 |
| EP | 0 346 743 A2 | 12/1989 |
| JP | 05058190 A | 3/1993 |

* cited by examiner

*Primary Examiner*—Hau V Phan
(74) *Attorney, Agent, or Firm*—Gerald E. Hespos; Michael J. Porco

(57) ABSTRACT

A hybrid drive for a motor vehicle includes an internal combustion engine and an electric motor, which, together with at least one auxiliary unit, are connected via a belt/chain drive. The internal combustion engine and the electric motor have respective drive elements with unidirectional freewheeling devices for the belt/chain drive, thus automatically achieving a predefined belt/chain speed.

20 Claims, 3 Drawing Sheets

HYBRID DRIVE FOR A MOTOR VEHICLE

This application claims the priority of German application 10 2006 060 872.0, filed Dec. 22, 2006, the disclosure of which is expressly incorporated by reference herein.

BACKGROUND AND SUMMARY OF THE INVENTION

The present invention relates to a hybrid drive for a motor vehicle with an internal combustion engine and an electric motor.

A hybrid drive is defined as a combination of various drive principles or energy sources for the task of driving during use. The use of hybrid drives, which exhibit an internal combustion engine and an electric motor, is also increasing in the construction of modern motor vehicles. By operating the internal combustion engine in a very good efficiency range, it is possible to save fuel while driving. However, the motor vehicle has not only the electric motor, but also other auxiliary units, such as an air conditioner compressor, a servo pump or a fan, all of which have either their own electric motor or are connected to the crankshaft of the internal combustion engine for the purpose of driving via a belt drive. However, the latter variant is problematic in hybrid motor vehicles, since in the case of a pure electric drive, the internal combustion engine is disengaged, thus eliminating a drive of the auxiliary units by means of the crankshaft and the belt drive. Therefore, hybrid motor vehicles require that an alternative drive source is assigned to each auxiliary unit. However, this feature is complex in design and expensive. Especially when electric motors are used as the drive sources of the auxiliary units, there is an increase not only in the complexity of the control and wiring, but also in the complexity of the management of the electric energy budget of the vehicle.

The present invention deals with the problem of providing an improved embodiment of a hybrid drive for a motor vehicle, so that it is possible to design and operate in a simple and economical manner the auxiliary units, disposed in the motor vehicle, when the internal combustion engine is disengaged.

The invention solves this problem by way of a hybrid drive for a motor vehicle, including an internal combustion engine, an electric motor, at least one auxiliary unit, and a belt/chain drive by which the internal combustion engine, the electric motor, and the at least one auxiliary unit are connected together in a drive relationship, in which the internal combustion engine and the electric motor have respective drive elements with unidirectional freewheeling devices for the belt/chain drive.

Advantageous embodiments are also claimed.

According to the invention, the mechanical energy generated by the electric motor is used for driving the auxiliary units. To this end, an internal combustion engine and an electric motor of the hybrid drive and at least one auxiliary unit are connected together in a drive relationship by means of a belt/chain drive. In so doing, both the internal combustion engine and the electric motor have a respective drive element with a unidirectional freewheeling device for the belt/chain drive. Therefore, in a purely internal combustion engine drive state, the belt/chain drive is driven by the internal combustion engine and transforms the mechanical movement into a torque at the electric motor as well as a torque at the auxiliary unit. As a result, the auxiliary unit is driven, and at the same time a vehicle battery is charged up, by means of the electric motor, which acts as a generator. When the vehicle battery is totally charged, the drive element at the electric motor can be shifted into the free running mode, so that despite the rotating crankshaft, the electric motor no longer rotates concomitantly. In contrast, in the electric motor drive state, the freewheeling device at the drive element of the crankshaft of the internal combustion engine is actuated, so that the electric motor drives only said at least one auxiliary unit, whereas the crankshaft does not rotate.

In an advantageous further development, the freewheeling device of the drive element of the electric motor is closed up to a limit speed $v_{limit}$ of the belt/chain drive and is opened at a higher speed, whereas the freewheeling device of the drive element of the internal combustion engine is closed after the limit speed $v_{limit}$ and is opened at a lower speed. In this way, it is possible to establish an exactly defined speed at the auxiliary units, where the speed is speed-independent of the speed of the electric motor and/or the speed of the internal combustion engine. This feature makes it possible to design the auxiliary units specifically in terms of the necessary power output. Thus, it is possible to achieve both a reduction in weight and cost of the auxiliary units. Thus, a design of the auxiliary units with respect to both adequate power output at minimum speed and as a high speed-fixed auxiliary unit can be dispensed with. In particular, mechanical stress on the auxiliary units can also be limited, so that the auxiliary units have to be designed in essence only with respect to a constant operating state/power output state and no longer need to cope or rather cover, as in the past, varying operating/power output states.

It is desirable to provide the drive element of the internal combustion engine with a clutch and/or a brake, which enables a belt/chain speed that is independent of the speed of the drive element. Thus, it is possible to set a constant belt/chain speed, which corresponds preferably to an ideal drive speed of the auxiliary unit that is driven with the belt/chain drive, even at high speeds of the crankshaft of the internal combustion engine. In so doing, it is conceivable that the electric motor drives the belt/chain drive in a lower speed range, whereas the internal combustion engine drives the belt/chain drive at higher speeds, at which the freewheeling device of the drive element, arranged at the electric motor, is already activated. If the speed of the crankshaft in the internal combustion engine continues to increase, the clutch and/or the brake prevents the overshooting of a predefined belt/chain speed. This measure also eliminates the need for a high speed-fixed design of the auxiliary units, thus making it possible to manufacture them more economically.

Other important features and advantages of the invention follow from the dependent claims, the drawings and the associated description of the figures with reference to the drawings.

The aforementioned features and those mentioned below can be applied not only in the specified combination, but also in other combinations or alone without departing from the scope of the present invention.

Preferred embodiments of the invention are depicted in the drawings and are explained in detail in the following description. Identical reference numerals and symbols refer to the same or similar or functionally identical components.

DETAILED DESCRIPTION OF THE INVENTION

Figure 1:
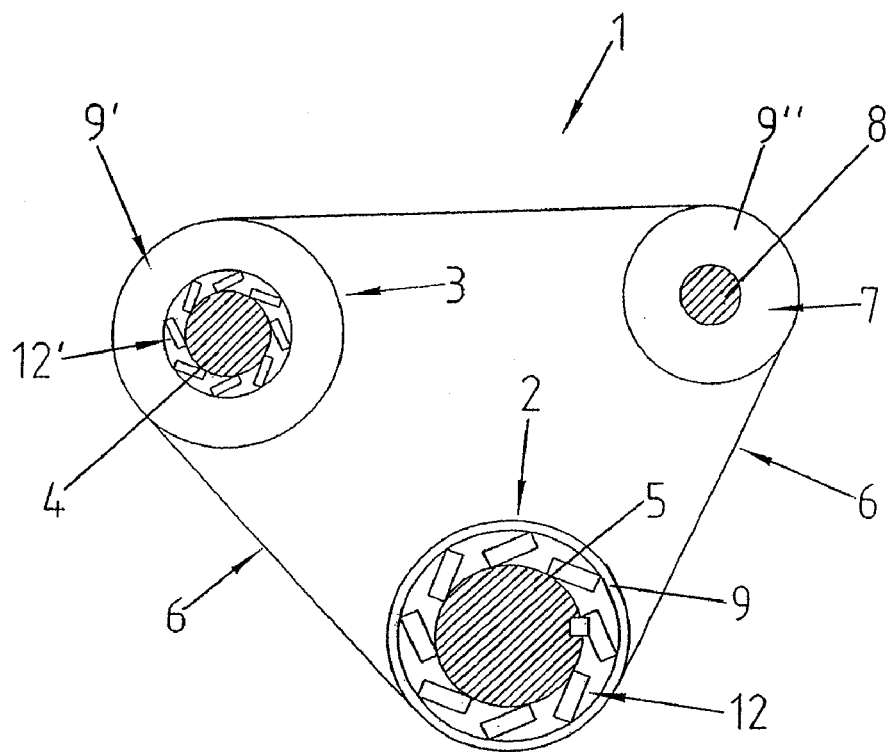
FIG. 1 is a schematic drawing of a possible configuration of an internal combustion engine and an electric motor, as viewed in the direction of the axes of a crankshaft or of an electric motor.

According to FIG. 1, an inventive hybrid drive 1 for a motor vehicle (which is not illustrated) exhibits an internal combustion engine 2 and an electric motor 3. In this case, a shaft 4 of the electric motor 3 as well as a crankshaft 5 of the internal combustion engine 2 run orthogonally to the image plane. The internal combustion engine 2, the electric motor 3 and at least one auxiliary unit 7 are connected together in a drive relationship via a belt/chain drive 6. The illustrated auxiliary unit 7 can be, for example, an air conditioner compressor and/or a servo pump and/or a fan and/or a water pump. A drive shaft 8 of the auxiliary unit 7 runs parallel to the shaft 4 of the electric motor 3 and/or the crankshaft 5 of the internal combustion engine 2 and, thus, also runs in essence orthogonally to the image plane.

According to the invention, the internal combustion engine 2 and the electric motor 3 have a respective drive element 9, 9' with a unidirectional freewheeling device 12, 12' for the belt/chain drive 6. Thus, the belt/chain drive 6 guarantees a drive connection between the internal combustion engine 2, the electric motor 3, and the at least one auxiliary unit 7. The use of the inventive drive elements 9, 9' makes it possible to move the belt/chain drive 6 to a predefined speed and/or belt/chain speed. This opens up the possibility of designing the respective auxiliary units 7 only with respect to a narrow range of belt/chain speeds and, thus, the possibility of reducing the weight and cost. To date, auxiliary units that were driven in such a manner had to be designed with respect to an adequate output power at a low speed and/or belt/chain speed, but had to exhibit, nevertheless, a fixed high speed, so that they could easily absorb a high belt/chain drive speed that was generated by the internal combustion engine 2.

Preferably the hybrid drive 1 of the invention is designed as a so-called full hybrid drive, which permits not only driving solely by means of the internal combustion engine, but also driving solely by means of the electric motor. In the purely electric drive state, when the internal combustion engine 2 is disengaged and/or the internal combustion engine 2 is in idle mode, the at least one auxiliary unit 7 is driven exclusively by the electric motor 3 at an essentially constant speed. In the purely internal combustion engine drive state starting, for example, at a speed of the internal combustion engine 2 of approximately 2,000 revolutions per minute, the internal combustion engine 2 takes over the drive of the auxiliary units 7. At this speed the freewheeling device 12' of the electric motor can be activated. It is also conceivable that the freewheeling device 12' is deactivated and that the electric motor 3 serves as the generator.

In general, the two freewheeling devices 12, 12' are speed-dependent. For example, the freewheeling device 12' of the drive element 9' of the electric motor 3 can be closed up to a limit speed $v_{limit}$ of the belt/chain drive 6 and opened at a higher speed, whereas the freewheeling device 12 of the drive element 9 of the internal combustion engine 2 is closed starting at the limit speed $v_{limit}$ and is opened at a lower speed.

At this stage the individual operating states of the inventive hybrid drive 1 shall be briefly explained below.

Figure 2:
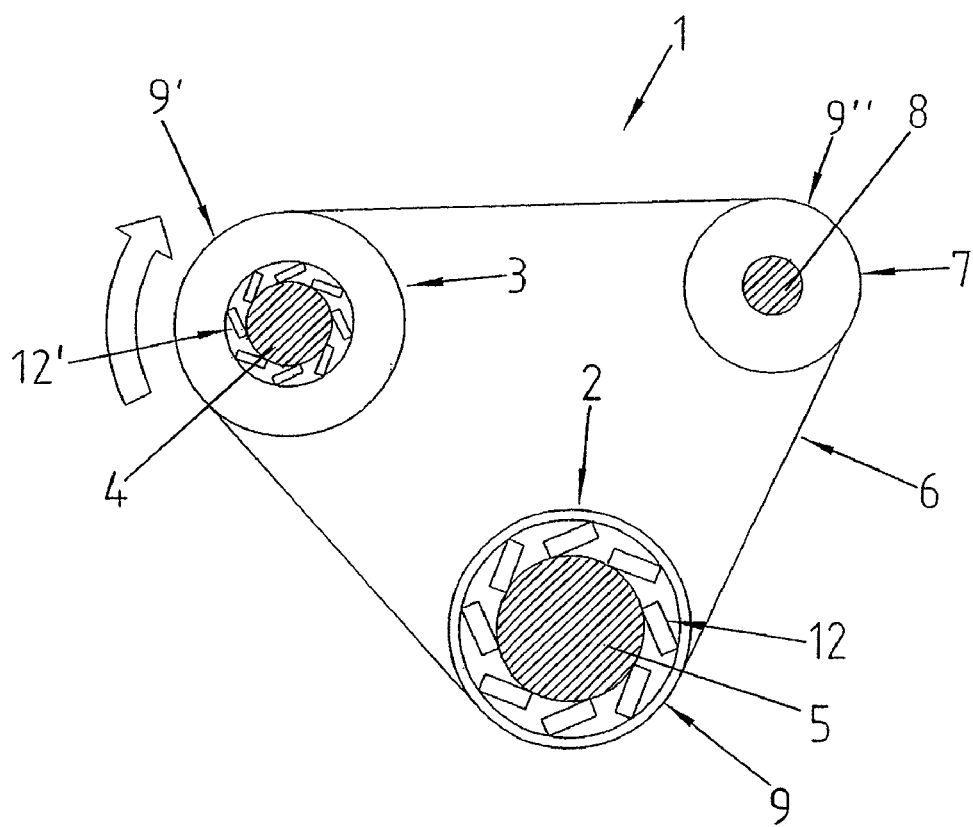
FIG. 2 is a schematic drawing of a representation, as in FIG. 1, where the electric motor drives the belt/chain drive.

FIG. 2 depicts a drive that is driven solely by means of an electric motor. The electric motor 3 drives the belt/chain drive 6 and, thus, the auxiliary unit 7. In so doing, the freewheeling device 12' of the drive element 9' at the electric motor 3 is closed and transmits a torque from the shaft 4 of the electric motor 3 to the drive element 9' and, thus, to the belt/chain drive 6. In contrast, the freewheeling device 12 of the crankshaft 5 is opened, so that no torque flows from the drive element 9 to the crankshaft 5. Thus, the internal combustion engine 2 can be in the disengaged state or can be operated in idle mode. In so doing, a speed of the shaft 4 of the electric motor 3 can be, for example, 2,000 revolutions per minute, which is transmitted to the auxiliary unit 7 at the same speed, assuming that the drive element 9' at the electric motor 3 and a corresponding drive element 9" at the auxiliary unit 7, which is drive-connected to the drive element, exhibit an identical radius. At the same time the speed of the crankshaft 5 of the internal combustion engine 2 is supposed to be less than the 2,000 revolutions per minute, cited above as an example.

Figure 3:
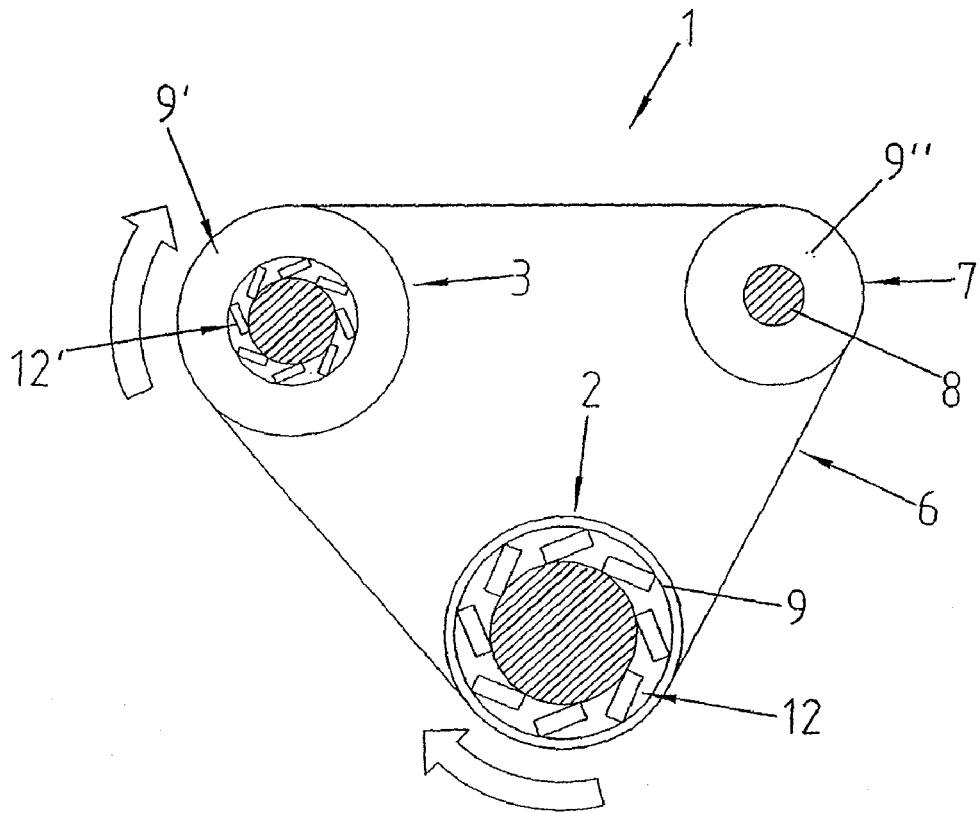
FIG. 3 is a schematic drawing of a changeover from an electric motor-driven drive to an internal combustion engine drive state.

As the speed increases, the drive output power that the internal combustion engine 2 takes over increases. At the same time the internal combustion engine 2 and the electric motor 3 are supposed to be complementary with respect to their speed range. While the electric motor 3 has its highest torque maximum in the lower speed range, it declines at the higher speeds. In contrast, the internal combustion engine 2 is more likely to exhibit a torque weakness in the lower speed range and reaches its torque maximum only at higher speeds. Therefore, it appears to be logical to dispense with the electric motor-driven drive after a selected speed limit and to use it, for example, as a generator. Therefore, FIG. 3 shows a changeover from the electric motor-driven drive to the internal combustion engine-driven drive. In this respect the electric motor 3 still continues to drive the belt/chain drive 6, where the freewheeling device 12' of the drive element 9' at the electric motor 3 is closed and transmits the torque, generated by the electric motor 3 and/or the shaft 4, to the drive element 9'. The internal combustion engine 2 runs at the same speed as the electric motor 3, so that, assuming drive elements 9 and 9' with identical radii and/or identical size, the freewheeling device 12 at the drive element 9 of the crankshaft 5 can also be closed. In so doing, the speed of the crankshaft 5 is, for example, 2,000 revolutions per minute.

Figure 4:
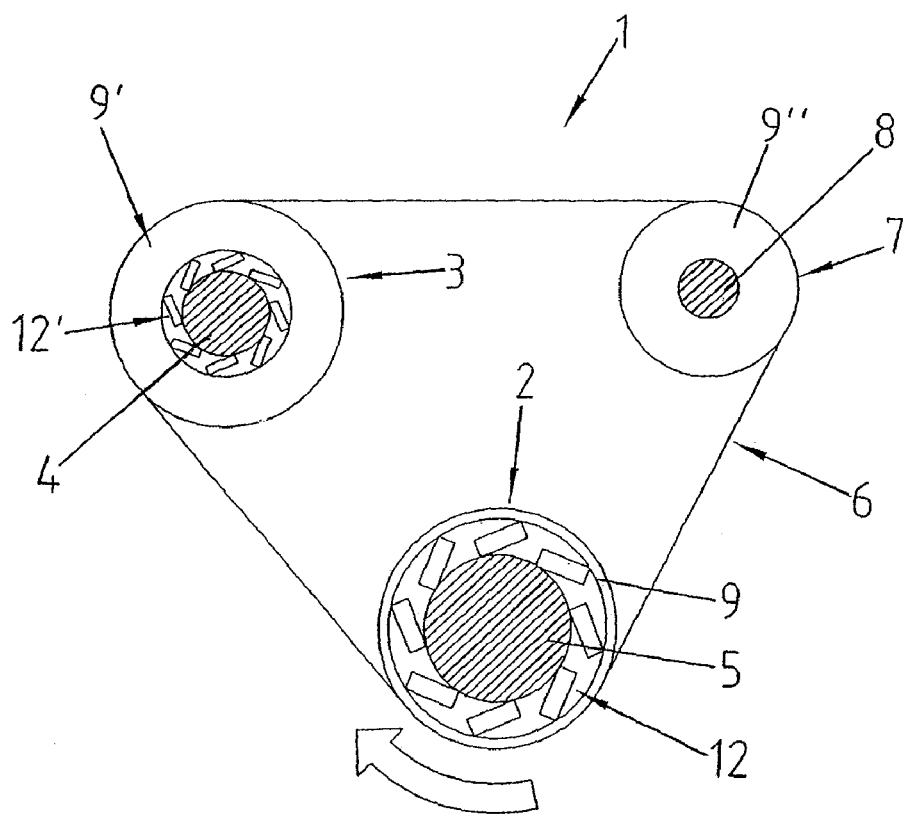
FIG. 4 is a schematic drawing of a drive state in which the assembly is driven purely by an internal combustion engine.

At this stage, as represented in FIG. 4, the internal combustion engine 2 takes over the drive. In so doing, the speed of the crankshaft 5 is, for example, higher than 2,000 revolutions per minute. The freewheeling device 12' of the drive element 9' of the electric motor 3 is opened, so that no torque flows from the drive element 9' to the shaft 4 of the electric motor 3. The freewheeling device 12 of the drive element 9 of the internal combustion engine 2 is closed. Therefore, if in turn it is assumed that the dimensions of the drive elements 9 and 9" are identical, the drive shaft 8 of the auxiliary unit 7 also exhibits now a speed exceeding 2,000 revolutions per minute. It is also, of course, conceivable that the freewheeling device 12' of the drive element 9' of the electric motor 3 is also closed and that the electric motor 3 is engaged in such a manner that it acts as a generator and that a vehicle battery can be charged.

As the speed of the internal combustion engine 2, or rather its crankshaft 5, continues to increase, the drive element 9 of the internal combustion engine 2 can be optionally provided with a clutch 10 and/or a brake 11, which enables a belt/chain speed that is independent of the speed of the drive element 9.

Thus, it is possible to limit the speed of the belt/chain drive 6 to a maximum speed, so that the auxiliary units 7 have to be designed only with respect to this maximum speed. In so doing, the clutch 10 can be designed, for example, as a permanent magnet clutch, whereas the brake 11 can be designed as an eddy current brake.

Figure 5:
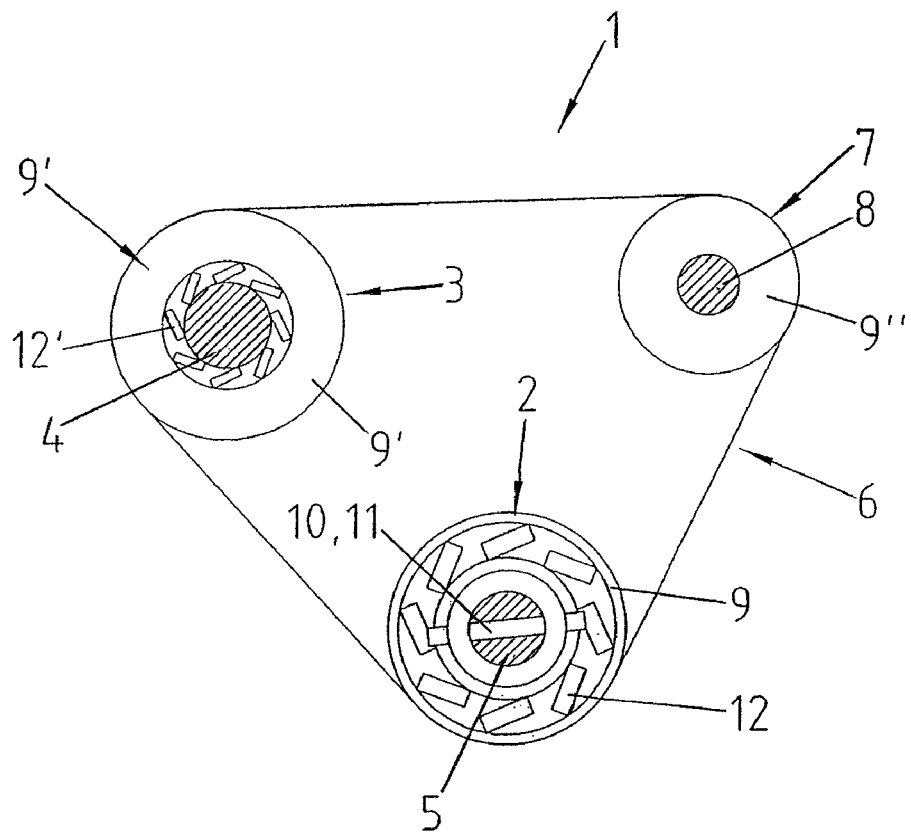
FIG. 5 is a schematic drawing of a clutch and/or a brake in the area of the drive element of the internal combustion engine.

FIG. 5 depicts a state in which the crankshaft 5 of the internal combustion engine 2 rotates at a speed exceeding 2,000 revolutions per minute. At the same time the freewheeling device 12 of the drive element 9 is closed. Therefore, the clutch 10 and/or the brake 11 limit(s) the speed of the drive element 9 to, for example, 2,000 revolutions per minute. The freewheeling device 12' of the drive element 9' of the electric motor 3 is also closed, so that it can be used, for example, as a generator for charging the vehicle battery. The auxiliary unit 7 rotates at the same speed as the drive element 9 of the internal combustion engine 2, once again assuming that a gear ratio between the drive element 9 of the internal combustion engine 2 and the drive element 9'' of the auxiliary unit 7 is 1:1.

Figure 6:
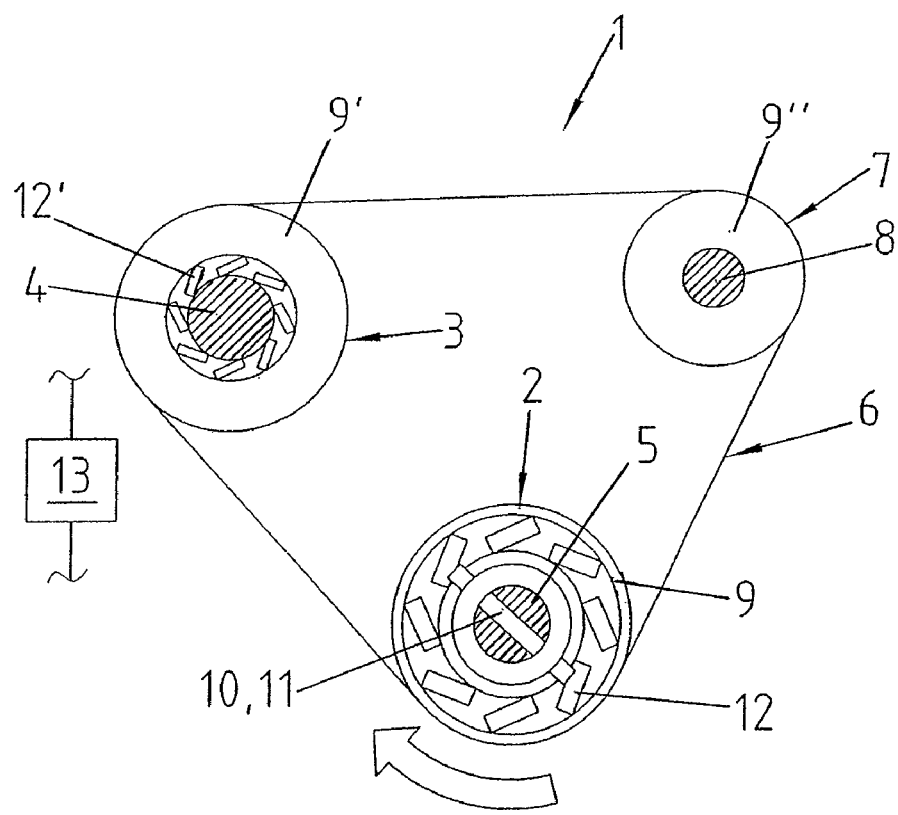
FIG. 6 is a schematic representation of an internal combustion engine-driven drive and a belt/chain speed, controlled by the clutch and/or the brake.

FIG. 6 depicts a situation similar to that shown in FIG. 5. In this case the freewheeling device 12' of the drive element 9' of the electric motor 3 is opened, so that no torque can be transmitted from the drive element 9' to the shaft 4 of the electric motor 3. This situation is in turn similar to a drive, which is driven solely by means of the internal combustion engine, as depicted in FIG. 5.

FIG. 6 also provides a control unit 13, which can be designed for controlling the belt/chain drive 6 and/or for controlling the freewheeling device 12' at the drive element 9' of the electric motor 3 and/or for controlling the freewheeling device 12 at the drive element 9 of the internal combustion engine 2 and/or for controlling the clutch 10 and/or the brake 11. In this respect the control unit 13 is connected in a suitable manner to the aforementioned components of the hybrid drive 1. Hence, the control unit 13 can also be used, of course, in a hybrid drive 1, according to FIGS. 1 to 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A hybrid drive for a motor vehicle, comprising:
   an internal combustion engine,
   an electric motor,
   at least one auxiliary unit, and
   a belt/chain drive by which the internal combustion engine, the electric motor, and the at least one auxiliary unit are connected together in a drive relationship,
   wherein the internal combustion engine and the electric motor each have respective drive elements with unidirectional freewheeling devices for the belt/chain drive and wherein the hybrid drive further comprises a control unit that is designed for controlling the freewheeling device at the drive element of the electric motor and the freewheeling device at the drive element of the internal combustion engine for selectively discontinuing transmission of a driving force to the internal combustion engine or the electric motor.

2. The hybrid drive as claimed in claim 1, wherein the freewheeling devices are speed dependent.

3. The hybrid drive as claimed in claim 2, wherein the freewheeling device of the drive element of the electric motor is closed up to a limit speed $V_{limit}$ of the belt/chain drive and is opened at a higher speed, and wherein the freewheeling device of the drive element of the internal combustion engine is closed after the limit speed $V_{limit}$ and is opened at a lower speed.

4. The hybrid drive as claimed in claim 2, wherein the drive element of the internal combustion engine is provided with at least one of a clutch and a brake, which enables a belt/chain speed that is independent of the speed of the drive element.

5. The hybrid drive as claimed in claim 2, wherein the at least one auxiliary unit is designed as at least one of an air conditioner compressor, a servo pump, a generator, a fan, and a water pump.

6. The hybrid drive as claimed in claim 1, wherein the freewheeling device of the drive element of the electric motor is closed up to a limit speed $V_{limit}$ of the belt/chain drive and is opened at a higher speed, and wherein the freewheeling device of the drive element of the internal combustion engine is closed after the limit speed $V_{limit}$ and is opened at a lower speed.

7. The hybrid drive as claimed in claim 6, wherein the drive element of the internal combustion engine is provided with at least one of a clutch and a brake, which enables a belt/chain speed that is independent of the speed of the drive element.

8. The hybrid drive as claimed in claim 7, wherein the at least one of the clutch and the brake limits the speed of the belt/chain drive to a maximum speed $V_{max}$.

9. The hybrid drive as claimed in claim 8, wherein the maximum speed $V_{max}$ of the belt/chain drive is higher than a limit speed $V_{limit}$.

10. The hybrid drive as claimed in claim 9, wherein the drive element of the internal combustion engine is provided with at least one of a clutch and a brake, which enables a belt/chain speed that is independent of the speed of the drive element.

11. The hybrid drive as claimed in claim 7, wherein the brake is designed as an eddy current brake.

12. The hybrid drive as claimed in claim 8, wherein the control unit further is designed for controlling at least one of the speed of the belt/chain drive, the clutch, and the brake.

13. The hybrid drive as claimed in claim 7, wherein the clutch is designed as a permanent magnet clutch.

14. The hybrid drive as claimed in claim 13, wherein the at least one of the clutch and the brake limits the speed of the belt/chain drive to a maximum speed $V_{max}$.

15. The hybrid drive as claimed in claim 11, wherein the at least one of the clutch and the brake limits the speed of the belt/chain drive to a maximum speed $V_{max}$.

16. The hybrid drive as claimed in claim 7, wherein the control unit further is designed for controlling at least one of the speed of the belt/chain drive, the clutch, and the brake.

17. The hybrid drive as claimed in claim 6, wherein the at least one auxiliary unit is designed as at least one of an air conditioner compressor, a servo pump, a generator, a fan, and a water pump.

18. The hybrid drive as claimed in claim 1, wherein the at least one auxiliary unit is designed as at least one of an air conditioner compressor, a servo pump, a generator, a fan, and a water pump.

19. The hybrid drive as claimed in claim 18, wherein the at least one of the clutch and the brake limits the speed of the belt/chain drive to a maximum speed $V_{max}$.

20. The hybrid drive as claimed in claim 1, wherein the drive element of the internal combustion engine is provided with at least one of a clutch and a brake, which enables a belt/chain speed that is independent of the speed of the drive element.

* * * * *